March 29, 1966 E. D. SKODZUS 3,243,276
CONTAINER AND/OR VIAL SHAPING APPARATUS AND METHOD THEREFOR
Filed Nov. 21, 1962 4 Sheets-Sheet 1

INVENTOR.
EUGENE D. SKODZUS
BY
E. S. HOLLER &
W. A. SCHAICH
ATTORNEYS

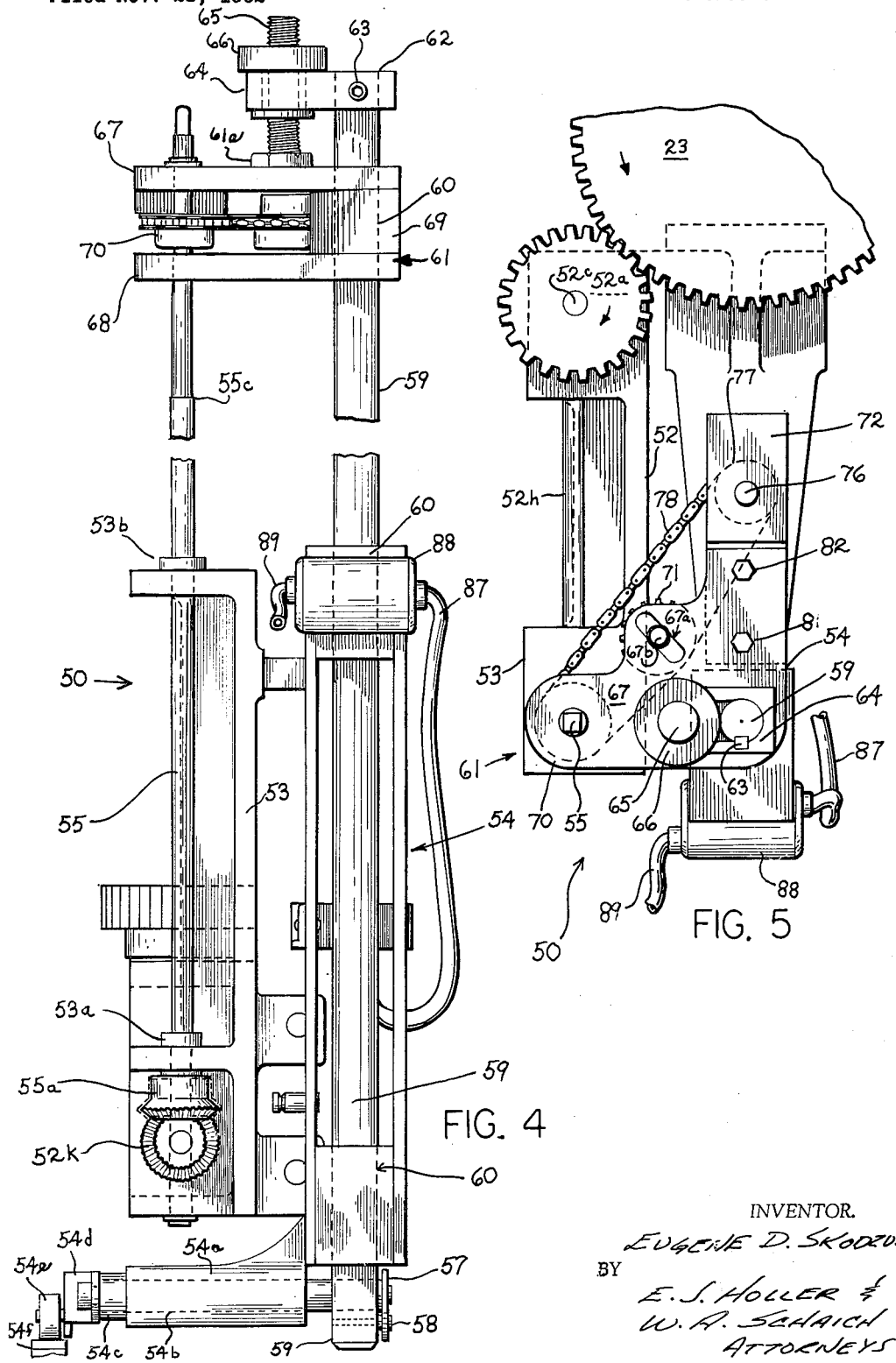

March 29, 1966 E. D. SKODZUS 3,243,276
CONTAINER AND/OR VIAL SHAPING APPARATUS AND METHOD THEREFOR
Filed Nov. 21, 1962 4 Sheets-Sheet 4

INVENTOR.
EUGENE D. SKODZUS
BY
E. J. HOLLER &
W. A. SCHAICH
ATTORNEYS

United States Patent Office 3,243,276
Patented Mar. 29, 1966

3,243,276
CONTAINER AND/OR VIAL SHAPING APPARATUS AND METHOD THEREFOR
Eugene D. Skodzus, Vineland, N.J., assignor to Owens-Illinois Glass Company, a corporation of Ohio
Filed Nov. 21, 1962, Ser. No. 239,202
15 Claims. (Cl. 65—109)

The present invention relates broadly to apparatus for treating glass tubing and more particularly to apparatus useful in the forming of glass tubing into generally small glass containers, vials, ampoules and the like.

Even more particularly, the present invention relates to an auxiliary apparatus of utility in forming a readily identifiable mark, decoration, lettering, proprietary indicia or the like on the surface of the container, vial, ampoule or the like.

Several forming machines are known to be generally practical and useful in forming small glass containers, vials, ampoules or the like from glass tubing. These machines are generally rotary in character for purposes of efficiency, thus embodying features which permit the utilization of a plurality of lengths of glass tubing at one and the same time. In these machines the lengths of tubing are individually held in a plurality of chucks or holding devices arranged in an annular array. The chucks proceed in rotary fashion and in intermittent motion from one work station to another work station wherein various heating and forming steps take place. One such rotary machine is disclosed, claimed and illustrated in U.S. Patent No. 2,935,819, issued to J. Dichter on May 10, 1960, and entitled "Machine for the Manufacture of Small Glass Bottles or the Like From Glass Tubes." The marking device or apparatus of the present invention will be described herein in connection with the basic machine described and illustrated in the referenced Dichter patent, although it should be recognized that the apparatus of this invention will be useful in connection with rotary machines of various other types, as will become more apparent from the detailed description to follow later herein.

It is an object of the present invention to provide apparatus which, operating in conjunction with container and vial forming apparatus known heretofore, permits a permanent identifying mark to be formed in the container.

It is also an object of the present invention to provide such apparatus novelly designed to impart such mark on a heat softened portion of said container during its formation.

It is another object of the present invention to provide an apparatus embodying novel features of construction permitting the die element, which serves to imprint the identifyng mark, to be rotated at the same speed as the rotating container having the heat softened area (usually bottom) whereby the identifying mark is sharply defined and clearly determinable.

It is still another object of the present invention to provide an apparatus which allows the identifying or marking step to be accomplished as an integral part of the container forming operation, thereby eliminating any subsequent independent operational step and thereby simplifying and shortening the overall container forming operation.

It is yet another object of the present invention to provide an apparatus of the foregoing type which is extremely flexible in operation in that different size containers in terms of axial length can be readily accommodated by means of an adjustment feature which is easily manipulated and which is readily accessible without the necessity of interrupting the desired continuous operation.

It is likewise an object of the present invention to provide an apparatus of the general type described which accomplishes the foregoing in an efficient and error-free manner by reason of the direct or positive driving connections between principal drive arrangements and the marking die precluding slippage and/or other malfunctions frequently associated with synchronous type operations.

The foregoing, as well as other objects of the present invention, will become apparent to those skilled in the art from the following detailed description taken in conjunction with the annexed sheets of drawings on which there is presented, for purposes of illustration only, a preferred embodiment of the apparatus of the present invention.

In the drawings:

FIG. 4 is a greatly enlarged side view of the apparatus shown in FIG. 3.

FIG. 5 is a top view, also enlarged, of the apparatus of the invention as viewed in FIGS. 3 and 4.

It will be appreciated that one disadvantage inherent in forming of glass containers by the employment of rotary machines known heretofore and utilizing tube stock as raw material is that the finished product contains no identifying mark or proprietary indicia of the manufacturer. The reason for this is that a mold, as known in the conventional glass container forming industry, is not employed. Such molds usually are provided with either a depressed or raised design outlining the desired mark or proprietary indicia. Since, as indicated, a mold is not used, it is usually necessary to resort to the subsequent application of an applied enameled frit or lead coloring enamel or, alternatively, a metal staining operation in order to mark vials, small containers, amopules or the like formed from glass tubing.

It is, accordingly, therefore a principal object of the present invention to provide an apparatus which is easily incorporated into known rotary machine operations and which permits a permanent, integral identifying indicia to be imparted to the glass while in a heat-softened state.

In its simplest embodiment the apparatus of the present invention comprises a head member located to overlie the path of an intermittently moving rotatable chuck holder device for an inverted container, a support shaft carrying said head member, a die rotatably mounted in said head in depending coaxial relationship with the axial center of said chuck in its stopped position beneath said head, drive means for rotating said die in synchronous relationship with said chuck and means for moving said die upwardly and downwardly into and out of contact with the bottom of said container.

Figure 1:
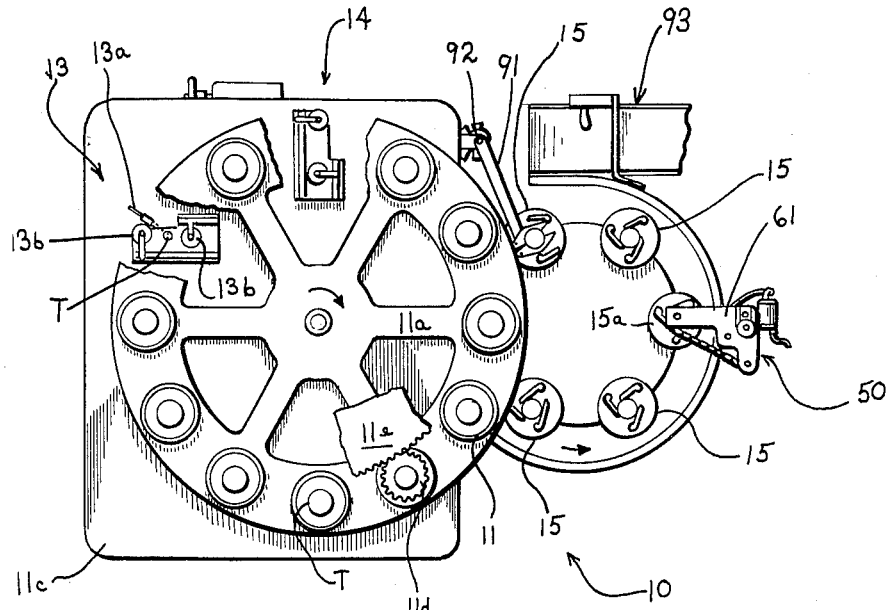
FIG. 1 is a top plan view, with portions broken away for clarity of illustration, of a rotary machine of the type illustrated in more detail in the above-referred to Dichter patent and including assembled therewith, on the right, the apparatus of the present invention.
Figure 2:
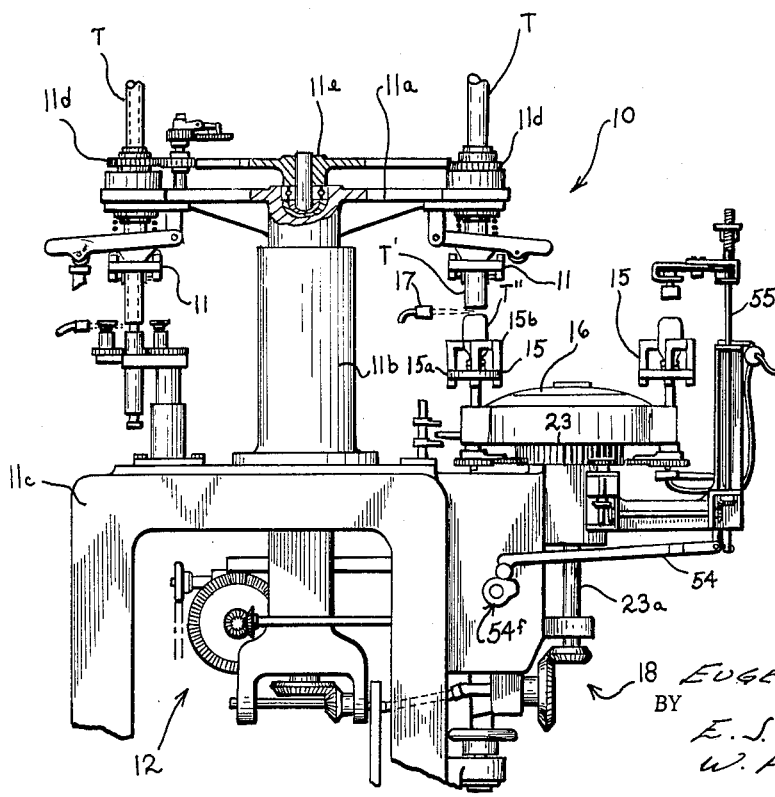
FIG. 2 is a front elevation view of the apparatus shown in FIG. 1 with a portion broken away to show the drive connection of the apparatus of the present invention shown on the extreme right in this figure.

Reference may now be had first to FIGS. 1 and 2 wherein the apparatus 50 of the present invention is shown in assembled operating relationship with the forming device 10, which device constitutes the subject matter of the aforesaid Dichter Patent No. 2,935,819. Since this latter patent contains a very detailed description and disclosure of the construction and operation of the forming device, no such detailed description will be undertaken herein beyond a few introductory remarks in order to explain the overall function, purpose and operation of this machine. The machine comprises a first rotary array of chucks or work piece holders 11 which are adapted for movement in a clockwise path indicated by the arrow in FIG. 1. The chucks depend from a support ring 11a which rotates in intermittent fashion about the pedestal 11b carried on the supporting framework 11c. The chucks 11 contain, above the support ring 11a, coaxially mounted gears 11d which are rotated by gear wheel 11e coaxially above the support ring 11a and driven by the gearing arrangement indicated generally by the reference numeral 12, the latter being described in more detail in the Dichter patent. A plurality of lengths of glass tubing T are vertically introduced downwardly through the chucks 11 and are gripped thereby. The pieces of tubing T held in the chucks 11 are spun by the action of the wheel 11e on the gears 11d. In intermittent stop and go movement the chucks 11 proceed in rotary fashion through different work stations. At these stations various operations are performed, such as heating localized areas to a plastic state whereby desired contours can be effected, for example, in the mouth portions of the ultimate container. One such station is identifitd in FIG. 1 by the reference numeral 13, as revealed by the breaking away of a portion of support ring 11a. The numeral 13a identifies a burner nozzle serving to impinge a flame upon a localized area of the rotating glass tube T. The reference numeral 13b identifies oppositely positioned forming wheels which are brought into contact with the heat softened area of the glass tube to form the contour of the mouth or the bottom as desired. The reference numeral 14 in FIG. 1 identifies yet another station wherein the support ring 11a and the chucks are brought to rest for another forming operation, although the chucks are continued individually in axial rotation.

The lower half of tubing T′ extending below the chuck is ultimately separated from the supply length and transferred to a lower annular array of spaced chucks 15 which are held in a framework 16 for intermittent stop and go rotation in a circular path which brings each of the lower chucks 15 in turn beneath the upper path defined by the chucks 11 and in particular as shown in FIG. 2. The chucks 15 composed of a bottom plate 15a and finger elements 15b hold the tube T″ separated by the action of the burner nozzle 17 or by a combination of a burner and a cold roll or wheel, as described in the Dichter patent. The chucks 15 proceed in a counter clockwise direction in intermittent fashion, passing through other work stations where, for example, a bottom may be formed by closing the annular upper lip of the glass tube separated from the continuous length, as shown in FIG. 2. The framework in which the chucks 15 are mounted is rotated to move the chucks in intermittent fashion by a level gear train arrangement, adequately disclosed in the Dichter patent but identified in FIG. 2 by the reference numeral 18. It may be noted that the chuck 15 rotates in counter clockwise fashion, as indicated by the arrow in FIG. 6. This rotation is effected by the coaxial mounting of the table portions 15a on vertical shaft 19 which extends through a bushing 20 secured to the frame 16 and thence terminating in coaxial spur gear 21. Spur gear 21 engages a spur gear 22 which in turn engages and is driven by a principal drive bull gear 23. The latter gear 23 is coaxially mounted on shaft 23a, which extends downwardly as shown in FIG. 2 to connect with the bevel gear train, indicated generally by the reference numeral 18 as aforesaid. The bushing 20 is integrally a part of the support ring 16 and rotates about the shaft 23a to move the chuck 15 through to the work stations in sequence as shown in FIG. 1. The shaft 19 includes an axial bore or passageway 19a. Chuck table 15a also contains a connecting bore 24. Likewise, spur gear 21 contains an axial bore 21a in communication with the bore 19a and also the hollow nipple 21b extending vertically below the gear 21. The foregoing passageways define an enclosed path for supply air in a manner and for a purpose described hereinafter.

In accordance with this invention there is provided a supporting framework 51, which framework includes a lateral portion 52 and a vertical portion 53. Alongside the vertical portion 53 there is situated another vertical framework 54 which is physically secured to the framework 53. The horizontal or lateral portion 52 includes spaced parallel ear flanges 52a and 52b which contain rotatably mounted therebetween a shaft 52c which has secured at one end, extending above flange 52b, a spur gear 52d which engages the principal driving bull gear 23, the latter serving to rotate the chuck 15. Shaft 52c also carries between the flanges 52a and 52b a bevel gear 52e. Lateral framework 52 includes vertical spaced wall segments 52f and 52g which have mounted rotatably therebetween a horizontal shaft 52h which has miter gears 52j and 52k mounted at opposite ends. Miter gear 52j engages miter gear 52e on the shaft 52c and rotates the horizontal shaft 52h responsive thereto together with miter gear 52k. Vertical framework 53 has journally mounted therein, as at 53a and 53b, a vertical shaft 55 which extends upwardly above the chuck 15 as shown. The lower end of the shaft 55 has coaxially secured thereto miter gear 55a which engages miter gear 52k and thereby rotates in a counter clockwise direction, as shown by the reference arrow in FIG. 6.

The framework 54 carries near the bottom a laterally extending boss 54a containing an axial bore 54b. Shaft 54c extends rotatably through the boss 54a at each end, connecting with a crank arm 54d. The crank arm bears, at its opposite end, a cam roller follower 54e adapted to rollably contact cam 54f. The shaft 54c also connects securely with a pviot arm plate 57. The pivot plate 57 is rotatably pinned as at 58 to the bottom end of a vertical shaft 59 which extends upward through vertical framework 54, slidingly moving in bearings as at 60. This sliding connection with the rigid framework 54, together with the cam action induced by the cam follower following the rotating cam, causes the shaft 59 to oscillate in a vertical fashion. The cam 54f is rotated by a suitable take-off drive mechanism from the principal gear drive mechanism for the machine and identified by the reference numeral 12 and/or 18.

The shaft 59 extends upward through a head member 61 and carries at its upper end a yoke 62 which may be vertically adjusted at any vertical position on the shaft 59, by means of the friction adjustment screw 63, for a purpose to be described hereinafter. Leg portions 64 of the yoke embrace a threaded shaft 65 which extends downwardly to connect with the head member 61 by the bolt 61a. An internally threaded collar 66 engages the threaded shaft 65 to provide for control of the length of the vertical stroke of the head member 61 carried by the shaft 59 responsive to its vertical oscillation induced by the cam arrangement just described.

Figure 3:
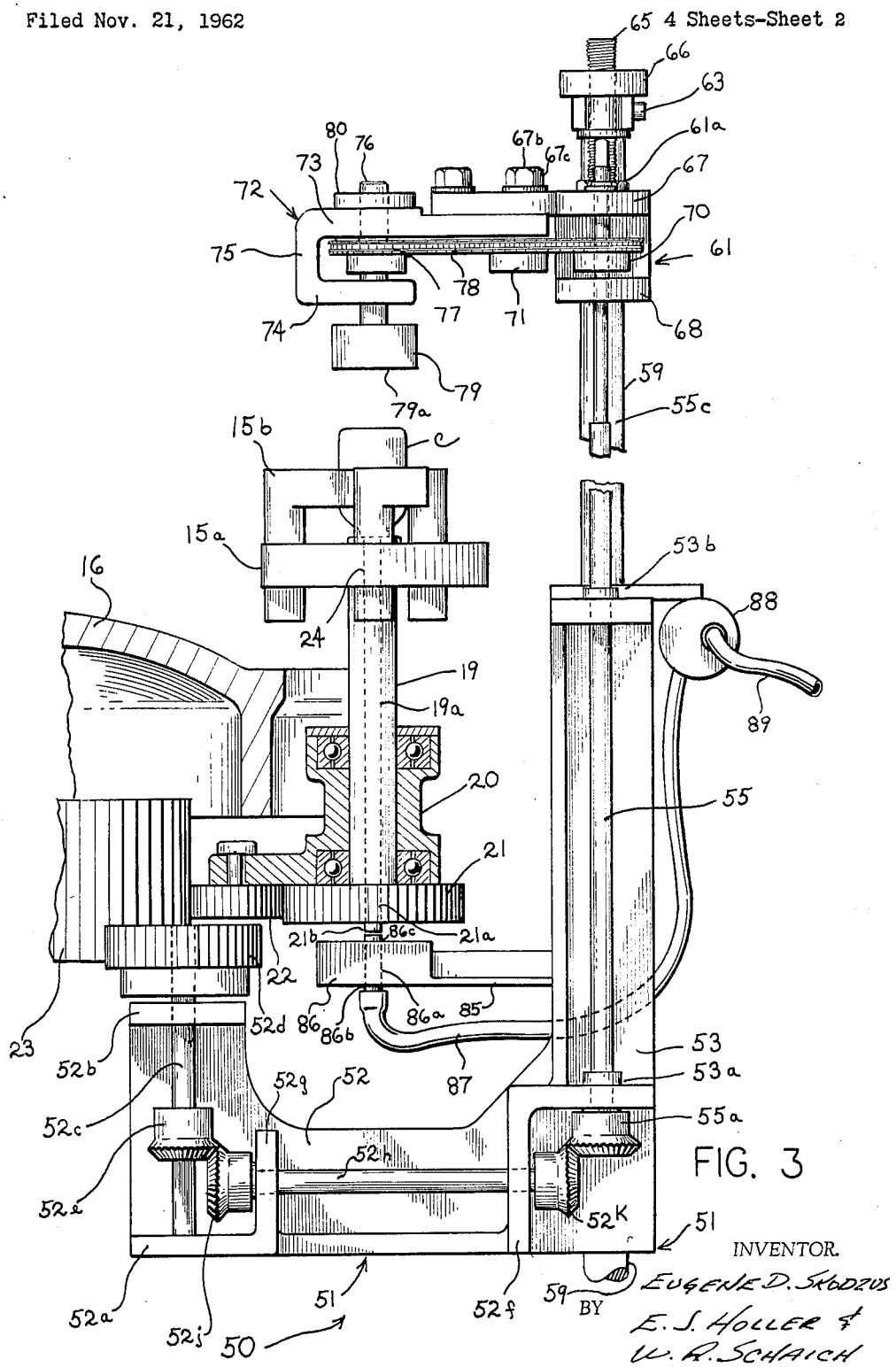
FIG. 3 is a view, greatly enlarged, of the principal apparatus of this invention (shown on the extreme right in FIGS. 1 and 2) with a portion of the basic machine broken away.

The head member 61 includes parallel spaced plates 67 and 68 which embrace the sliding bushing 69 through which the shaft 59 slidingly extends. The shaft 55 driven via the spur gear 52a and the array of miter gears, described within the framework 52, also extends upwardly through the plates 67 and 68. The shaft 55 above the point 55c in FIG. 3 is square in section and extends coaxially and slidably through a sprocket member 70, located between the plates 67 and 68. The construction as described permits the head member 61 to move slidably and vertically on the shaft 55. A spline connection may also be used to connect the shaft 55 and the sprocket 70 whereby the same action could be achieved. Upper plate 67 contains an elongated slot 67a permitting lateral adjustment of an idler sprocket 71 carried on a threaded shaft 67b secured in place by nut 67c.

Figures 6, 7:
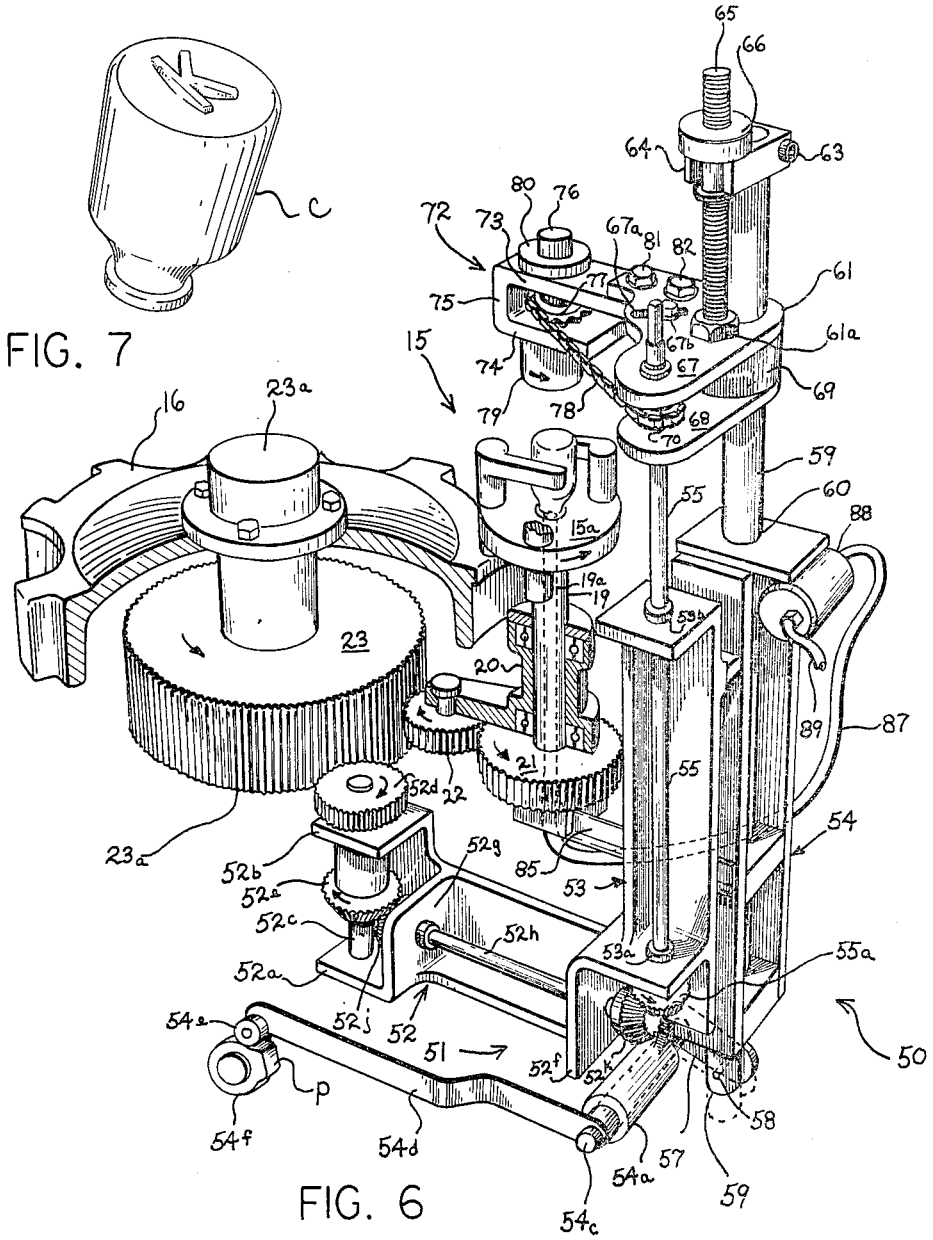
FIG. 6 is an overall perspective view of the apparatus of the invention as shown in FIGS. 3 through 5 and being included herein in order to convey a better understanding of the interrelationship and workings of the components.
FIG. 7 is a perspective view of a container bearing the identifying mark "K" in bold relief, the container having been formed from a section of glass tubing on the machine illustrated herein and marked by the apparatus of the present invention and particularly at apparatus as shown in FIGS. 5 through 6 herein.

As can be seen in FIG. 6, the head 61 includes a lateral extension 72 composed of spaced horizontal plates 73 and 74 bridged by vertical wall 75 and being bolted to plate 67, as shown at 81 and 82. A shaft 76 is rotatably mounted in the plates 73 and 74 and carries therebetween coaxially mounted sprocket 77. A chain 78 encompasses the sprockets 70, 71 and 77 whereby rotation of the shaft 55 will rotate the shaft 76. The lower end of the shaft 76, extending downwardly from plate 74, bears a die member 79. A bearing collar 80, shown in FIG. 3, on the shaft 76 aids in insuring alignment of the sprocket 77. The die 79 includes on its bottommost surface 79a a recessed design (or a raised letter design), for illustration shown as the outline of a K, which outline is duly formed in the bottom of a container C shown in FIG. 7 by displacement of heat-softened glass.

Framework 54, shown in FIGS. 3 and 6, has secured thereto a lateral flange 85 which terminates in a horizontal platform 86 having a central vertical bore 86a communicating with a nipple extension 86b extending therefrom for a connection with flexible hose 87 which is connected to air cylinder 88. Cylinder 88 is provided with an air inlet hose 89 for introducing air at the proper time. The nipple 86c terminates just short of the nipple 21b, extending below the spur gear 21. The purpose of the slight spacing of the nipples is to permit rotation of support ring 16 and to prevent undue air pressure from being built up in the axial bore 19a, communicating ultimately with the container C held by the finger elements 15b, thereby avoiding a break in the heat-softened wall. Suitable time switch means operating off of the cam 54f or other of the components of the machine or apparatus may be utilized to initiate a puff of air emanating through the air value 88 and thence through the flexible line 87 leading to the nipple 86c. This is preferably timed to occur at the same time as the descent of the marking die 79 into contact with the upwardly facing bottom of the container and thereby serves to prevent collapse of the bottom wall of the container by the contact of the die 79 therewith. Considerable importance attaches to this feature since the bottom wall will be in a formable state as induced by the flame issuing from a burner nozzle at some of the other stations of the array of lower chucks 15.

In the operation of the basic Dichter machine in combination with apparatus of this invention, the frame 16 brings a chuck 15 into the position shown in FIGS. 3 and 6, the bottom having been formed in the container C at a previous station. The chuck 15, and consequently the container, are rotating by reason of the rotation of the principal gear 23 acting through intermediate spur gears 22 and 21 connected to the shaft 19 upon which the chuck 15 is firmly and coaxially secured. The bushing 20 serves to preclude any eccentric rotation of the chuck table 15a or the container held thereby. At the same time the die 79 rotates in the direction indicated by the arrows in FIG. 6 (which is the same rotation as the chuck table 15a). The die's rotation is effected by the rotation of shaft 76, imparted by the chain 78, engaging sprocket 77 on shaft 76. The chain 78 is driven by sprocket 70 secured to shaft 55. Shaft 55 is driven by the gear chain defined by the bevel gear set 55a and 52k, shaft 52h, bevel gear set 52j–52e, vertical shaft 52c and spur gear 52a engaging bull gear 23.

With the die 79 rotating at the same angular speed as the chuck 15, the die is brought down into engaging contact with the bottom of the container C. At the same time as indicated hereinabove, a puff of air is introduced via line 87, bore 86a, nipples 86c and 21b into the axial bore 19a connecting with the container at its mouth, thereby forming a transverse planar bottom having an indicia and preventing collapse of the bottom wall. The downward movement of the die occurs since the head 61 in which the die is located is secured by bolt 61a to shaft 59. The latter oscillates verticlly by reason of the crank action of the crank arm 54d and in particular the pivot arm plate 57 responsive to contact of the cam roller 54c with the projection P on the cam 54f. The operation of the marking apparatus as described is repeated in timed sequence as another chuck rotates into position and stops beneath the die 79.

It will be appreciated that after a given run of orders for a given vial, ampoule or the like that a different size container would be very likely and desirably scheduled. An adjustment to permit this is very easily accomplished as one need only adjust the threaded collar 66 and the vertical adjustment of the yoke 64 by means of the set screw 63. Adjustment of these two will permit accommodation of a different size container in terms of axial length. The container holder fingers 15b of the chucks 15 are accommodative of different diameter containers. Thus while they are, by spring or other means, urged in a direction towards the center, they can be moved outwardly towards the periphery of the chuck table, thereby permitting them to accommodate containers of variable diameter.

The chuck, upon completion of the marking or identifying step as accomplished by the apparatus of the present invention, as described hereinabove, proceeds in a counter clockwise direction as viewed in FIG. 1 to a position just prior to its passing beneath the upper series of chucks 11 where the container is picked up by a pair of tongs 91 pivotably supported for lateral motion as at 92. The tongs 91 then pivot to move the container laterally onto the lateral and continuous conveyor apparatus designated generally by the reference numeral 93, permitting rapid removal of the finished containers from the situs of the forming operation.

From the foregoing description, it can be seen that I have provided a new and novel apparatus composed of an assemblage of interdependent elements which cooperate together to provide a very efficient yet simple operation in accomplishing a permanent imprinting or marking of a formable or heat-softened bottom of a glass container formed from glass tubing. It will be further observable that the apparatus in accordance with this invention does not require extensive modification of the basic machine disclosed in the aforesaid Dichter patent. The marking operation may be discontinued and the apparatus disassembled and removed from the situs of the basic machine operation without interfering with the continuity of operation of the Dichter machine.

For ease of illustration I have not shown the utilization of burner nozzles. It will be appreciated, however, that their use may be desirable if found necessary after routine experimentation and operation. It is usually necessary in the preferred embodiment relating to glass containers that the bottom of the container C be maintained in a somewhat softened state so that the die can transfer a permanent mark thereto, either in the form of recessed or elevated impressions defining the desired mark, decoration, lettering or the like.

Modifications may be resorted to without departing from the spirit and scope of the invention as defined in the appended claims.

I claim:

1. Apparatus for forming a heat-softened bottom of a preformed glass container, vial, or the like, which comprises the combination of a chuck member adapted to hold a container in inverted coaxial relationship therewith with the mouth opening facing downwardly, drive means for continuously rotating said chuck member, a support shaft, a head member mounted on said shaft and positioned above said container, a die rotatably journaled in said head in depending coaxial relationship with the central axis of said chuck, second drive means synchronized with said first drive means for rotating said die, and means for moving said support shaft vertically upwardly and downwardly whereby said die moves into and out of forming contact with said bottom while rotating at the same speed.

2. Apparatus as claimed in claim 1, wherein said apparatus includes means for delivering air pressure to the mouth opening of said container, thereby furnishing internal pneumatic support to said heat-softened bottom wall.

3. Apparatus as claimed in claim 2, wherein said means includes an air delivery tube and an axial passageway within said chuck, said passageway being adapted for fluid-sealed communication with the mouth opening of said inverted container, said tube and passageway being axially aligned but spaced slightly apart to provide protection against surges in pressure in said air delivery tube.

4. Apparatus for shaping the temporarily deformable bottom of a preformed glass container, vial, or the like, which comprises a plurality of chucks disposed in annular horizontal array, each adapted to hold a container in inverted coaxial relationship therewith, means for intermittently moving said chucks in a rotary path, drive means for simultaneously continuously rotating said chuck members axially, a support shaft, a head member carried by said shaft in a position over said path, a die rotatably journaled in said head in depending coaxial relationship with said chuck, second drive means connecting said first drive means and said die, and means for moving said vertical shaft vertically up and down in timed relation with the movement of said chucks in their rotary path whereby said die moves into and out of forming contact with said deformable bottom while rotating at the same speed.

5. Apparatus as claimed in claim 4, wherein said last mentioned means includes a cam movable in timed sequence with said chucks in proceeding from station to station, a crank arm pivotably secured to a fixed framework, a cam follower mounted on said crank arm at one end for contact with said cam, said support shaft being rotatably secured to said crank arm at the end opposite said cam follower whereby pivoted movement of said crank arm responsive to said cam and cam follower causes oscillating vertical movement of said head member and depending die.

6. Apparatus for shaping a selected area of an article which comprises means for converting an area portion of said article surface to a deformable state, chuck means adapted to grip and to rotate said article so that said portion is rotating coaxially with said chuck, support means, a die rotatably journaled in said support means in coaxial relationship with the central axis of said chuck, drive means adapted to rotate said die synchronously with said chuck and means for moving said die into and out of contact with said deformable portion.

7. Apparatus for shaping a selected portion of an article which comprises means for converting said portion of said article surface to a deformable state, chuck means adapted to grip and to rotate said article so that said portion is rotating coaxially with said chuck, means for rotating said chuck and said article held therein, a support shaft, a support member mounted on said shaft, a die rotatably journaled in said member in coaxial relationship with the center of said chuck, second drive means connected with said rotation means for synchronous rotation of said die, and means for moving said support shaft to bring said die into and out of forming contact with said portion to effect a localized change in the contour of said article surface.

8. The method of shaping a plurality of glass containers in continuous sequence which comprises arranging said plurality in annular inverted array, moving said containers in intermittent stepwise fashion, continuously rotating said containers axially, softening the upwardly facing closed-end portion of said containers in sequence, positioning a die in coaxial registration with said containers in turn as they are intermittently at rest in their stepwise motion though still rotating axially, rotating said die at the same speed as said container and moving said die into and out of contact with said closed-end portion while said container is at rest in its intermittent stepwise motion to thereby shape said portion.

9. The method of shaping a container formed of heat-softenable material which comprises locating said container in inverted relationship with the mouth opening facing downwardly, softening the upwardly facing closed-end bottom portion of said container, simultaneously rotating said container to maintain a uniform wall thickness, positioning a forming die coaxially above said container, rotating said die at the same rotational velocity as said container and moving said die into and out of forming contact with the upwardly facing bottom portion of said container and introducing a stream of gas upwardly into said mouth to lend internal pneumatic support to said softened portion during forming.

10. Apparatus for forming or shaping a softened wall portion of a mouth-containing receptacle formed of a heat-softenable material, said apparatus comprising
    a support member including a planar platform having a passageway extending from its upper surface to terminate in an inlet opening remote therefrom and means for holding said container invertedly with said mouth resting on said platform over said passageway and communicating therewith,
    an air delivery tube having an outlet opening generally axially aligned with and spaced slightly from said inlet opening, whereby air flowing under pressure from said outlet opening will proceed across said space to said inlet opening and upwardly through said passageway into said container to pneumatically support said wall portion while in a heat-softened state,
    die means supportingly located above said support member,
    means for rotating said support member and die means in synchronous relationship and
    means for moving said die into and out of forming contact with a container wall portion while in a heat-softened state.

11. Apparatus for forming or shaping a softened wall portion of a mouth-containing receptacle formed of a heat-softenable material, said apparatus comprising
    a support member including a planar platform having a passageway extending from its upper surface to terminate in an inlet opening remote therefrom and means for holding said container invertedly with said mouth resting on said platform over said passageway and communicating therewith,
    a gas delivery tube having an outlet opening spaced slightly from said inlet opening, whereby gas flowing under pressure from said outlet opening will proceed across said space to said inlet opening and upwardly through said passageway into said container to pneumatically support said bottom wall while in a heat-softened state and
    means for rotating said support member whereby a tool or die may be brought into forming contact with said softened portion while pneumatically supported.

12. Apparatus for forming a softened bottom wall of a mouth-containing receptacle formed of a heat-softenable material, said apparatus comprising
    a chuck member including a planar platform having a vertical passageway extending from its upper surface to terminate in an inlet opening therebelow and means for holding said container invertedly with said mouth resting on said platform over said passageway and communicating therewith, means for rotating said chuck member,
an air delivery tube having an outlet opening generally axially aligned with and spaced slightly from said inlet opening,
means for furnishing air to said tube under sufficient pressure that air will flow across said space and upwardly through said passageway into said containers to pneumatically support said bottom wall while in a heat-softened state,
a support shaft,
a head member carried on said shaft positioned above said chuck member,
a forming die rotatably carried on said head in depending coaxial relationship with the axis of rotation of said chuck member,
second means for rotating said forming die,
means for moving said support shaft vertically, thereby bringing said forming die into and out of forming contact with said bottom wall and
means synchronizing the rotational velocity of said chuck member and forming die.

13. Apparatus for forming a heat-softened bottom wall of a mouth-containing container formed of a heat-softenable material, said apparatus comprising.
a principal drive gear disposed for horizontal rotation,
a rotatable frame,
a plurality of chuck members carried in annular array on said frame, said chuck members being mounted in spaced concentric relationship about said principal drive gear,
means for intermittently moving said frame to cause said chuck members to travel in a rotary path in stop and go movement including an at-rest forming position,
gear means connecting said principal drive gear with said chuck members for effecting axial rotation of said chuck members,
said chuck members including a platform having an upper surface and containing a passageway extending from said surface to an inlet opening remote therefrom and means for releasably holding said containers invertedly with said mouth in communication with the surface opening of said passageway,
a stationary air delivery tube having an outlet opening located proximate said path and positioned to assume coaxial spaced relationship with said inlet openings of said chuck members when sequentially at said forming position,
a support shaft located proximate said path controlled for timed vertical movement,
a head mounted adjustably on said shaft,
a forming die rotatably carried by said head in depending coaxial relationship with the axis of rotation of said chuck members at said forming position,
means connecting said principal drive gear and said forming die and
means for moving said support shaft vertically as said chuck member underlies said head whereby said forming die will move into and out of forming contact with said bottom wall while said container and forming die are rotating at the same rate of speed.

14. Apparatus for forming a heat-softened bottom wall of a mouth-containing container formed of a heat-softenable material, said apparatus comprising.
a principal drive gear disposed for horizontal rotation,
a rotatable frame,
a plurality of chuck members carried in annular array on said frame, said chuck members being mounted in spaced concentric relationship about said principal drive gear,
means for intermittently moving said frame to cause said chuck members to travel in a rotary path in stop and go movement including an at-rest forming position,
gear means connecting said principal drive gear with said chuck members for effecting axial rotation of said chuck members,
said chuck members including a platform having an upper surface and containing a passageway therein and terminating at an inlet opening remote therefrom and means for releasably holding said containers invertedly with said mouth surrounding the surface opening of said passageway,
means for issuing a stream of air to said inlet opening as said chuck members assume said at-rest forming position,
a support shaft located proximate said forming position and being controlled for timed vertical movement,
a head mounted adjustably on said shaft,
a forming die rotatably carried by said head in depending coaxial relationship with the axis of rotation of said chuck members at said forming position,
means connecting said principal drive gear and said forming die and
means for moving said support shaft vertically as said chuck member underlies said head whereby said forming die will move into and out of forming contact with said bottom wall while said container and forming die are rotating at the same rate of speed.

15. Apparatus for forming a heat-softened bottom wall of a mouth-containing container formed of a heat-softenable material, said apparatus comprising
a principal drive gear disposed for horizontal rotation,
a rotatable frame,
a plurality of chuck members carried in annular array on said frame, said chuck members being mounted in spaced concentric relationship about said principal drive gear, said chuck members being adapted to releasably hold said containers invertedly with the bottom wall facing upwardly,
means for intermittently moving said frame to cause said chuck members to travel in a rotary path in stop and go movement including an at-rest forming position,
gear means connecting said principal drive gear with said chuck members for effecting axial rotation of said chuck members,
a support shaft located proximate said forming position and being controlled for timed vertical movement,
a head mounted adjustably on said shaft,
a forming die rotatably carried by said head in depending coaxial relationship with the axis of rotation of said chuck members at said forming position,
means connecting said principal drive gear and said forming die and
means for moving said support shaft vertically as said chuck member underlies said head whereby said forming die will move into and out of forming contact with said bottom wall while said container and forming die are rotating at the same rate of speed.

References Cited by the Examiner

UNITED STATES PATENTS

| | | | |
|---|---|---|---|
| 1,914,205 | 6/1933 | Hooper et al. | 65—109 X |
| 1,972,717 | 9/1934 | Schutz | 65—242 X |

FOREIGN PATENTS 210,107  9/1957  Australia.

DONALL H. SYLVESTER, *Primary Examiner.*
A. D. KELLOGG, *Assistant Examiner.*